(12) United States Patent
Ting

(10) Patent No.: US 7,916,192 B2
(45) Date of Patent: Mar. 29, 2011

(54) METHOD FOR COMPENSATING PIXEL VALUES OF DEFECTIVE PIXELS AND IMAGE PROCESSING SYSTEM USING THE SAME

(75) Inventor: Hou-Chun Ting, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 588 days.

(21) Appl. No.: 11/624,697

(22) Filed: Jan. 19, 2007

(65) Prior Publication Data

US 2008/0122954 A1 May 29, 2008

(30) Foreign Application Priority Data

Oct. 26, 2006 (TW) ................................ 95139498 A

(51) Int. Cl.
*H04N 9/64* (2006.01)
(52) U.S. Cl. ...................................................... 348/247
(58) Field of Classification Search .................. 348/246, 348/247
See application file for complete search history.

(56) References Cited

U.S. PATENT DOCUMENTS

| 6,819,359 | B1 * | 11/2004 | Oda ............................... 348/247 |
| 7,224,484 | B1 * | 5/2007 | Reeves et al. .................. 358/1.9 |
| 7,250,969 | B2 * | 7/2007 | Sakurai et al. ................ 348/246 |
| 2004/0095488 | A1 | 5/2004 | Rambaldi et al. |

OTHER PUBLICATIONS

"Office Action of Taiwan counterpart application", issued on Jan. 21, 2010, p. 1-p. 8.

* cited by examiner

*Primary Examiner* — David L Ometz
*Assistant Examiner* — Dillon Durnford-Geszvain
(74) *Attorney, Agent, or Firm* — Jianq Chyun IP Office

(57) ABSTRACT

A method for compensating pixel values of defective pixels in an image processing system is provided. First, a normal image is captured to obtain the pixel values of a plurality of pixels, and the pixel values of the defective pixels are then marked as a specific pixel value. When the pixel values are to be compensated, the locations of the defective pixels are determined by locating the specific pixel value, and the average values of the neighboring pixels of these defective pixels are calculated and used as the pixel values of these defective pixels, so as to complete a compensation procedure. Besides, the present invention further includes closing the shutter to capture a dark image with similar exposure condition as the normal image does. The compensation procedure is performed after subtracting the dark image from the normal image so that the noise caused by dark current can be eliminated.

20 Claims, 5 Drawing Sheets

METHOD FOR COMPENSATING PIXEL VALUES OF DEFECTIVE PIXELS AND IMAGE PROCESSING SYSTEM USING THE SAME

CROSS-REFERENCE TO RELATED APPLICATION

This application claims the priority benefit of Taiwan application serial no. 95139498, filed Oct. 26, 2006. All disclosure of the Taiwan application is incorporated herein by reference.

BACKGROUND OF THE INVENTION

1. Field of the Invention

The present invention relates to an image processing method and a system thereof. More particularly, the present invention relates to a method for compensating pixel values of defective pixels in an image by embedding the location information of the defective pixels in the image and an image processing system using the same.

2. Description of Related Art

Generally, when capturing an image with a digital still camera (DSC), noise is always produced in the image by dark current even though no light enters the image sensor. This is because an electronic photo-sensitive device has to work with power supply which inevitably generates heat, and "heat" is the main factor for the production of dark current which causes the electronic photo-sensitive device to produce noise. To resolve this problem, usually a normal image is captured with the DSC first, and a dark image is then captured with similar exposure condition after the shutter of the DSC is closed. The noise caused by dark current can be eliminated by subtracting the dark image from the normal image.

Besides the foregoing problem of dark current, not all the image sensing pixel units can work properly due to the yield design of the image sensor in today's DSC system. Wherein defective image sensing pixel units may cause incorrect pixel values of the corresponding pixels in the image, which may further affect the display quality of the image. Those pixels having incorrect pixel values are referred to as defective pixels. Generally speaking, defective pixels exist more or less in the photo-sensitive device of any DSC; however, such a photo-sensitive device can be compensated for the pixel values of defective pixels within an acceptable range through an image processing mechanism in the DSC, so as to resolve the problem of bad display quality caused by the defective pixels.

According to a conventional method for compensating pixel values of defective pixels, the neighboring pixels of the defective pixels (usually pixels on the left and right sides or all around the defective pixels) are located through a location information of the defective pixels, and the average pixel values of these neighboring pixels are used for replacing the pixel values of the defective pixels. The location information of the defective pixels is usually obtained through testing before the DSC leaves the factory and is recorded in a memory in the DSC. Later on, when every time an image is captured, an image signal processor in the DSC reads the location information of the defective pixels from the memory to compensate the pixel values of these defective pixels.

However, according to the method described above, the pixel information of the image and the location information of the defective pixels have to be read from the memory every time when a pixel is processed. Moreover, these two information are respectively stored in two different storage spaces in the memory; thus, the two different storage spaces have to be accessed at the same time, accordingly the access bandwidth of the memory is increased.

SUMMARY OF THE INVENTION

Accordingly, the present invention is directed to a method for compensating pixel values of defective pixels in an image, wherein the location information of the defective pixels is embedded in the image.

According to another aspect of the present invention, an image processing system is provided, wherein the location information of defective pixels in an image is embedded in the image so that the pixel values of the defective pixels can be compensated and the access bandwidth of a memory can be reduced.

The present invention provides a method for compensating the pixel values of defective pixels. The method is suitable for compensating the pixel values of a plurality of defective pixels in an image processing system. The method includes following steps. First, in step a., a first image is captured to obtain the pixel values of a plurality of pixels, and the pixel values of the defective pixels in the image are marked as a specific pixel value. Wherein if the pixel value of a particular pixel is equal to the specific pixel value, the pixel value of this pixel is changed to another close value. Next, in step b., a plurality of neighboring pixels around locations of the specific pixel value is located, and the average pixel values of the neighboring pixels are calculated and used as the pixel values of the defective pixels.

According to an exemplary embodiment of the present invention, step b. further includes following steps. First, a second image is captured to obtain the pixel values of the pixels. Next the first image is read from a storage unit. After that, the pixel values of the first image are respectively subtracted from the pixel values of the second image so as to obtain a third image. Finally, those pixels having the specific pixel value are located in the first image, and the average pixel values of the neighboring pixels of the corresponding pixels in the third image are calculated and used as the pixel values of the defective pixels in the third image.

According to an exemplary embodiment of the present invention, one of the first image and the second image is a dark image captured when the shutter of the image processing system is closed.

The present invention further provides an image processing system including an image sensor, an image signal processor, and a first storage unit. The image sensor includes a plurality of pixels and is suitable for capturing a first image. The image signal processor is coupled to the image sensor and is suitable for receiving the first image, so as to obtain the pixel values of a plurality of pixels, and the pixel values of the defective pixels are marked as a specific pixel value. Wherein if the pixel value of a particular pixel is equal to the specific pixel value, the pixel value of this pixel is changed to another close value. The first storage unit is coupled to the image signal processor and is suitable for storing the first image processed by the image signal processor. Before outputting the first image, the image signal processor reads the previously processed first image from the first storage unit, locates a plurality of neighboring pixels around the locations of the specific pixel value in the first image, and calculates the average pixel values of these neighboring pixels as the pixel values of the defective pixels.

According to an exemplary embodiment of the present invention, the image signal processor further performs following functions: receiving a second image from the image sensor; reading the first image from the first storage unit;

subtracting the pixel values of the first image from the pixel values of the second image so as to obtain a third image; locating the pixels having the specific pixel value in the first image; and calculating the average pixel values of the neighboring pixels around the corresponding pixels in the third image as the pixel values of the defective pixels in the third image.

According to the present invention, the location information of defective pixels is embedded in an image by marking the pixel values of the defective pixels as a specific pixel value, thus, it is not necessary to access the location information of the defective pixels repeatedly while a compensation procedure is performed, so that the access bandwidth of the memory is reduced. Moreover, with the location information of the defective pixels embedded in the image, the noise caused by dark current may be eliminated and the pixel values of the defective pixels may be compensated.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Exemplary embodiments of the present invention will be described in detail with reference to accompanying drawings.

Figure 1:
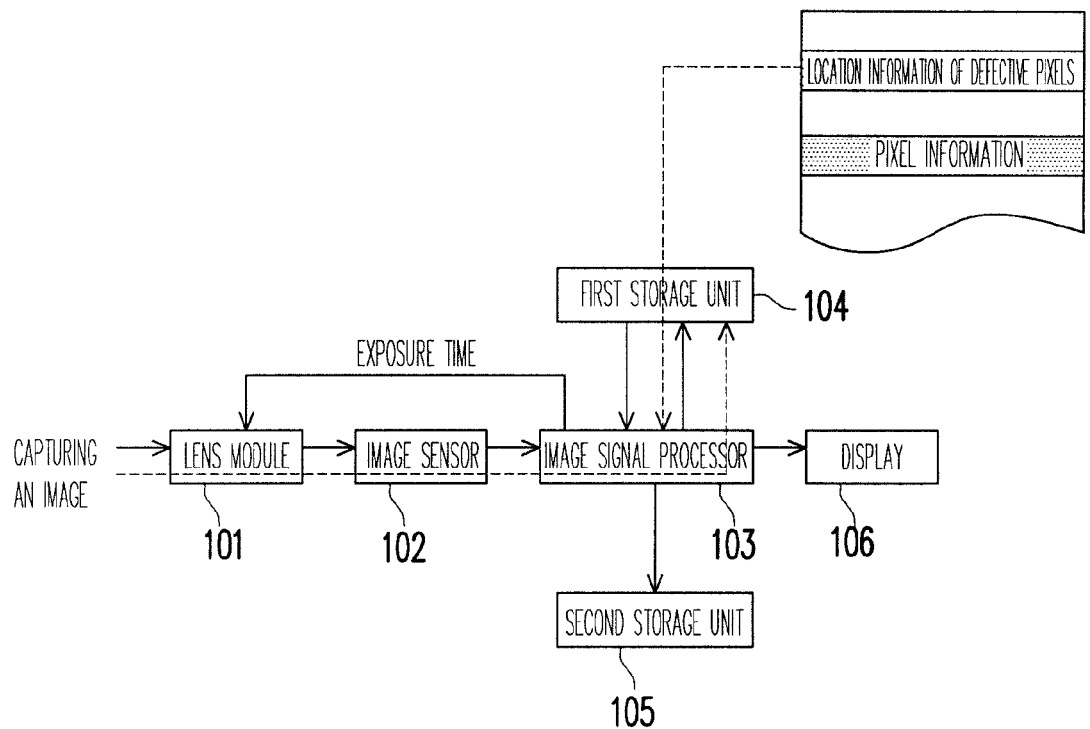
FIG. 1 illustrates an image processing system according to an exemplary embodiment of the present invention.

FIG. 1 illustrates an image processing system according to an exemplary embodiment of the present invention. Referring to FIG. 1, in the present embodiment, the image processing system includes a lens module 101, an image sensor 102, an image signal processor 103, a first storage unit 104, a second storage unit 105, and a display 106.

The lens module 101 receives a control signal from the image signal processor 103 for controlling the exposure time, and the lights of an object form an image on the image sensor 102 through the open lens module 101. The image sensor 102 converts an image photon signal into an electrical signal and sends the electrical signal to the image signal processor 103 to be processed.

The image signal processor 103 stores the image detected by the image sensor 102 into the first storage unit 104, performs a compensation process to the defective pixels in the image, and stores the processed image into the second storage unit 105. In addition, the image signal processor 103 also sends the processed image data to the display 106 to be previewed by a user. The first storage unit 104 may be a dynamic random access memory (DRAM), the second storage unit 105 may be a hard disk (HD) or a flash memory, and the display 106 may be a liquid crystal display (LCD). However, the scopes of the foregoing components are not limited in the present invention, and other suitable storage units or displays may also be adopted according to the actual requirement.

For example, when an image is captured with a digital still camera (DSC), the location information of defective pixels is first read from the first storage unit 104, and the pixel values of the defective pixels in the image are sequentially marked as a specific pixel value by the image signal processor 103. Wherein if the pixel value of a particular pixel is equal to the specific pixel value, the pixel value of this pixel is changed to another close value, and the foregoing pixel values are stored in the first storage unit 104. After that, the processed image is read from the first storage unit 104, the locations of the specific pixel value (the locations of the defective pixels) are located in the image, and the pixel values of the defective pixels are compensated by the average pixel values of the neighboring pixels around the locations of the specific pixel value. Thus, it is not necessary to access the pixel information of the image and the location information of the defective pixels in the first storage unit 104 at the same time for compensating the pixel values of the defective pixels, so that the access bandwidth of the memory is reduced.

Figure 2:
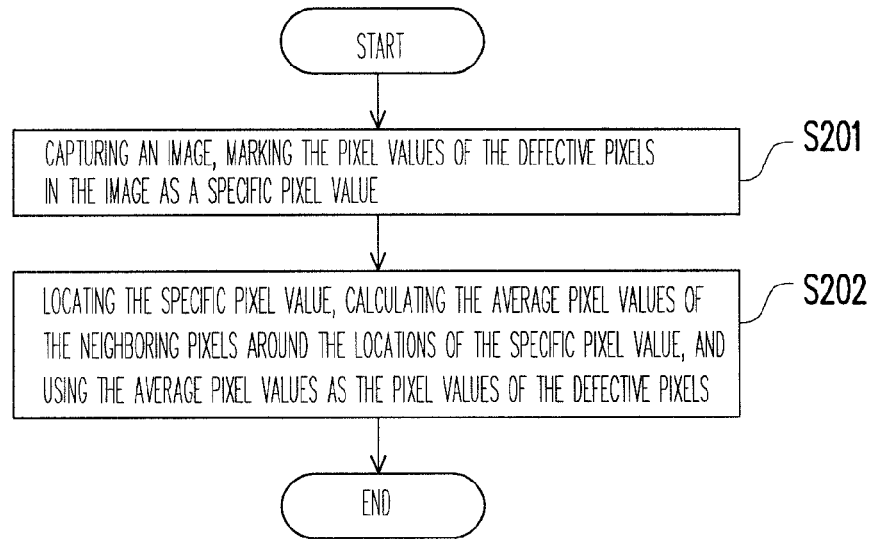
FIG. 2 is a flowchart illustrating a method for compensating pixel values of defective pixels according to an exemplary embodiment of the present invention.

FIG. 2 is a flowchart illustrating a method for compensating pixel values of defective pixels according to an exemplary embodiment of the present invention. Referring to FIG. 2, first, in step S201, an image is captured with a DSC, and the defective pixels in the image are located through the location information of the defective pixels pre-recorded in the DSC, and the pixel values of the defective pixels are marked as a specific pixel value. Wherein the specific pixel value may be 0 or 255 and the scope thereof is not limited by the present invention.

For example, assuming the specific pixel value is 0, the original pixel values of the defective pixels in the image are changed to 0. Here the pixel values of other pixels in the image may also be 0, thus, those pixel values have to be replaced with other pixel values. One of the methods for replacing these pixel values is to replace the pixel values of those pixels which has pixel value 0 with another close pixel value, such as 1, and another method is to re-calculate the pixel values (0~255) of all the non-defective pixels in the image through mapping to allow the pixel values of these pixels to fall between 1 and 255.

If the specific pixel value is 255, the original pixel values of the defective pixels in the image have to be replaced with 255. Similarly, the pixel values of those pixels which originally have pixel value 255 can be replaced with another close value (for example, 254), or the pixel values of all non-defective pixels in the image are re-calculated through mapping to fall between 0~254.

After the pixel values of the defective pixels have been marked, the image signal processor can locate the defective pixels by finding the locations of the specific pixel value in the image by using only one channel to read the image when the image is to be subsequently processed, and the image signal processor uses the average pixel values of the neighboring pixels around these locations of the specific pixel value as the pixel values of the defective pixels, so as to complete a compensation procedure (step S202).

Figure 3:
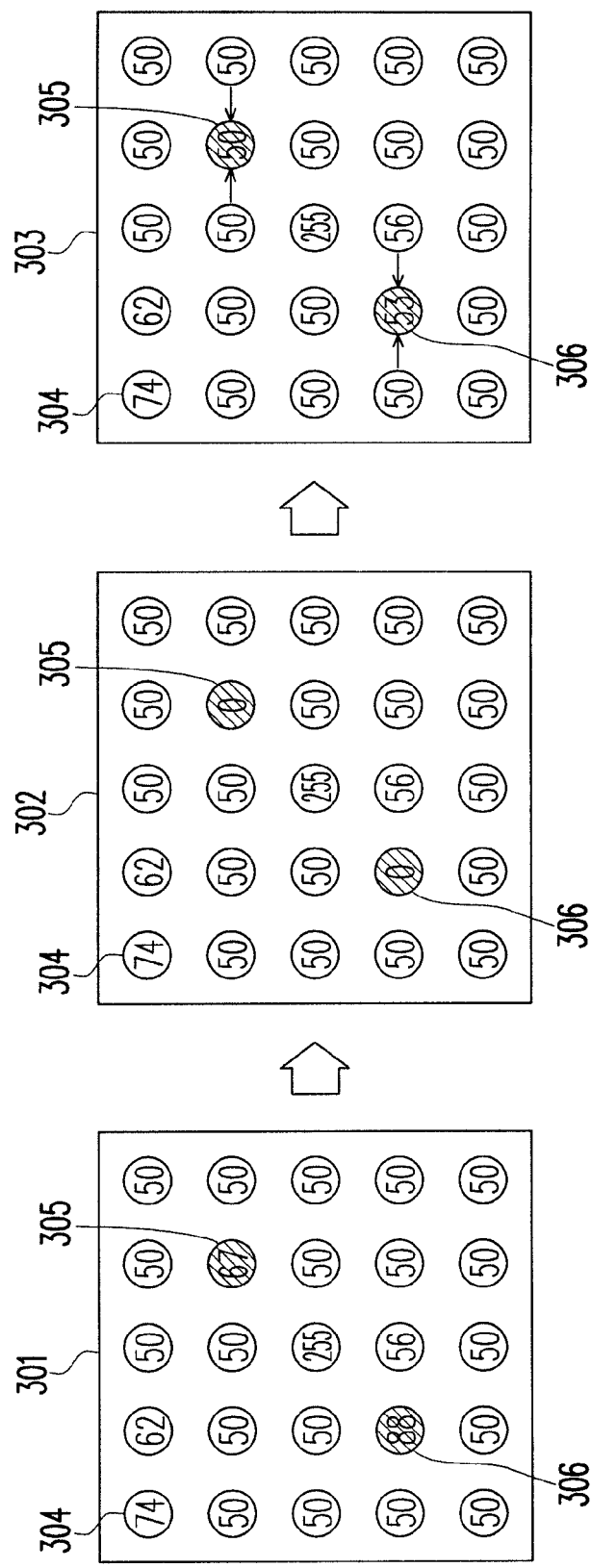
FIG. 3 illustrates a method for compensating pixel values of defective pixels according to an exemplary embodiment of the present invention.

FIG. 3 illustrates a method for compensating pixel values of defective pixels according to an exemplary embodiment of the present invention. Referring to FIG. 3, in the present embodiment, an image 301 is captured with a DSC and the pixel values of the pixels in the image 301 are obtained. It is assumed that the pixel value of pixel 304 is 74 and pixels 305~306 are defective pixels in the image 301. Here the pixel values of pixels 305~306 in the image 301 are marked as a specific pixel value 0 so that the image 302 is obtained. Next, the locations of the defective pixels are located in the image 302 by looking for pixels which have pixel value 0, and further the average pixel values of the neighboring pixels around these locations are used as the pixel values of the defective pixels, so that a compensation procedure is completed and a compensated image 303 is obtained. Wherein the pixel value of pixel 305 is compensated as the average pixel value 50 of its neighboring pixels and the pixel value of pixel 306 is compensated as the average pixel value 53 of its neighboring pixels.

Figure 4:
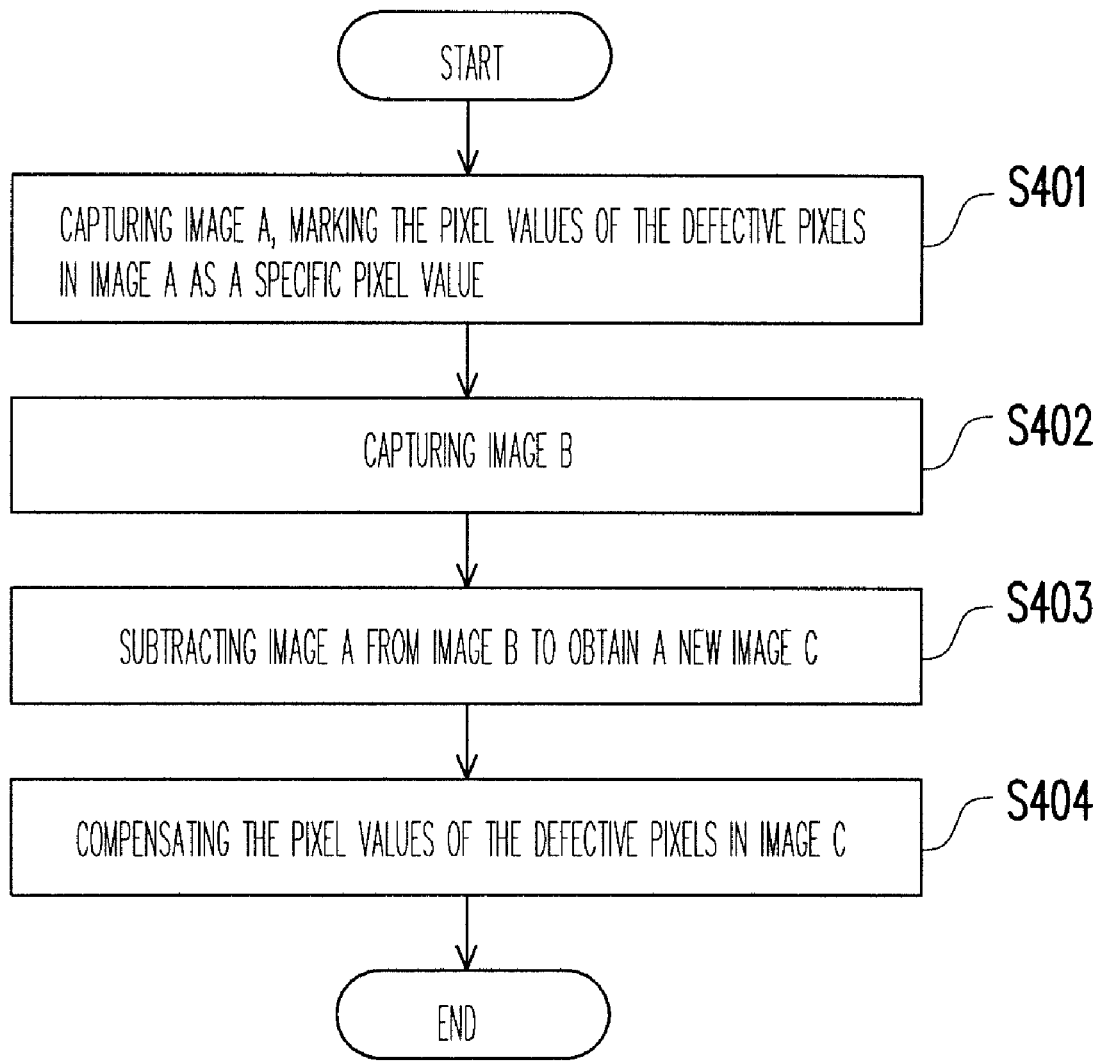
FIG. 4 is a flowchart illustrating a method for compensating pixel values of defective pixels according to another exemplary embodiment of the present invention.

According to another embodiment of the present invention, the noise caused by dark current is eliminated and the pixel values of the defective pixels are compensated by marking the pixel values of the defective pixels as a specific pixel value. FIG. 4 is a flowchart illustrating a method for compensating pixel values of defective pixels according to an exemplary embodiment of the present invention. Referring to FIG. 4, generally speaking, the noise in an image caused by dark current can be eliminated by capturing a dark image when the shutter of the DSC is closed and subtracting the dark image from a normal image.

First, in step S401, an image A is captured with a DSC, and as described in foregoing embodiment, the pixel values of the defective pixels in image A are marked as a specific pixel value. Next, in step S402, an image B is captured with the DSC. Image A is a normal image, while image B is a dark image captured with the shutter closed. In step S403, image A is subtracted from image B to obtain a new image C to eliminate the noise in image A. The noise caused by dark current has been eliminated in image C. However, the wrong pixel values caused by the defective pixels still exist. Thus, in step S404, pixels which have the specific pixel value are located in image A and a compensation procedure is performed to compensate the pixel values of the defective pixels.

Figure 5:
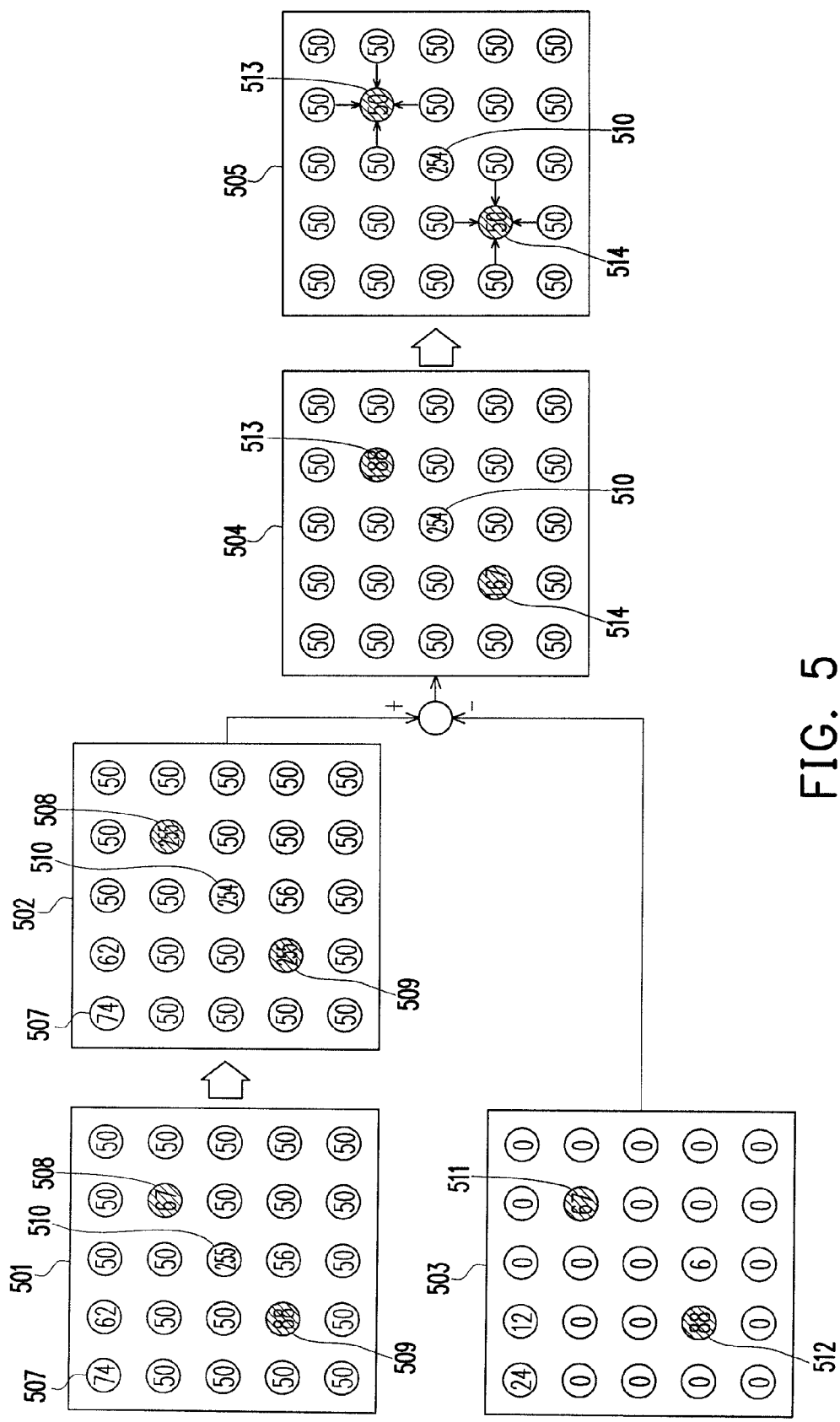
FIG. 5 illustrates a method for compensating pixel values of defective pixels according to another exemplary embodiment of the present invention.

FIG. 5 illustrates a method for compensating pixel values of defective pixels according to an exemplary embodiment of the present invention. Referring to FIG. 5, in the present embodiment, the image 501 captured with a DSC is a normal image, and the pixel values of various pixels in the image 501 are obtained. Wherein the pixel value of pixel 507 is 74, and the pixels 508~509 are defective pixels in the image 501. An image 502 is obtained by marking the pixel values of the pixels 508~509 in the image 501 as a specific pixel value 255.

The original pixel value of pixel 510 in the image 501 is 255, which is the same as the specific pixel value 255 set previously. The pixel value of pixel 510 is changed to 254 to prevent the pixel 510 from being considered as a defective pixel during the compensation procedure.

A dark image 503 is captured after the shutter is closed, and the pixel values of various pixels in the image 503 are obtained. Wherein the pixels 511~512 are defective pixels in the image 503. After that, the image 502 (the normal image) is subtracted from the image 503 (the dark image) to obtain a new image 504. In this step, the noise caused by dark current in the image 501 is eliminated.

Finally, the compensation operation to the pixel values of the defective pixels is completed by locating the pixels having pixel value 255 in the image 502 and using the average pixel values of the neighboring pixels as the pixel values of these pixels. Wherein the pixel values of pixels 513 and 514 (the defective pixels) have been compensated as the average pixel value 50 of their neighboring pixels.

It should be noted that in the present embodiment, the method for marking defective pixels may also include re-calculating the pixel values of all the non-defective pixels in the image through mapping to allow the pixels values of these non-defective pixels to fall within a range excluding the specific pixel value. For example, if the foregoing specific pixel value is 255, the re-calculated pixel values will fall between 0 and 254.

Figure 6:
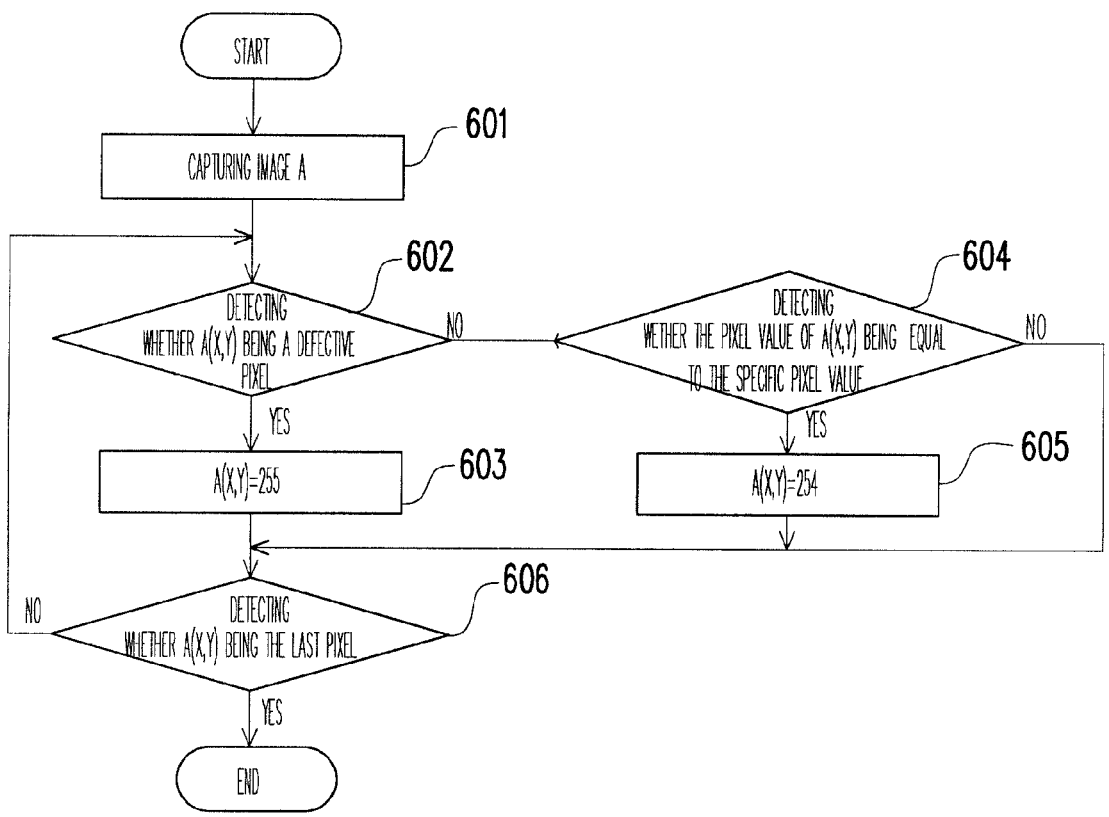
FIG. 6 is a flowchart illustrating a method for capturing an image and marking the pixel values of defective pixels in the image as specific pixel values according to another exemplary embodiment of the present invention.

Another embodiment of the present invention will be described below to explain in detail the flow of marking the pixel values of the defective pixels as a specific pixel value (step S401/S402). FIG. 6 is a flowchart illustrating a method for capturing an image and marking the pixel values of defective pixels in the image as specific pixel values according to an exemplary embodiment of the present invention. Referring to FIG. 6, in step 601, an image is captured with a DSC and the pixel values of various pixels in the image are obtained. In step 602, each pixel A(x, y) in the image is checked to determine whether it is a defective pixel by reading the location information of defective pixels pre-recorded in the DSC, wherein x and y respectively represent the x-coordinate and the y-coordinate of pixel A in the image.

In step 602, if a pixel is determined to be a defective pixel, the process proceeds to step 603, and the pixel value of this pixel is marked as a specific pixel value 255. After that, the process proceeds to step 606, wherein whether this pixel is the last pixel in the image is determined, and if so the step of marking defective pixels is completed, otherwise step 602 is preceded to, wherein the next pixel is checked.

In step 602, if the pixel to be checked is not a defective pixel, step 604 is executed to further detect whether the pixel value of the pixel is equal to the specific pixel value 255. If the pixel value of the pixel is the same as the specific pixel value, step 605 is executed to replace the pixel value of this pixel with pixel value 254, and the process proceeds to step 606; otherwise the process directly proceeds to step 606 to check whether the pixel is the last pixel in the image. If so, the step of marking defective pixels is completed, otherwise step 602 is executed to detect whether the next pixel in the image is a defective pixel.

Figure 7:
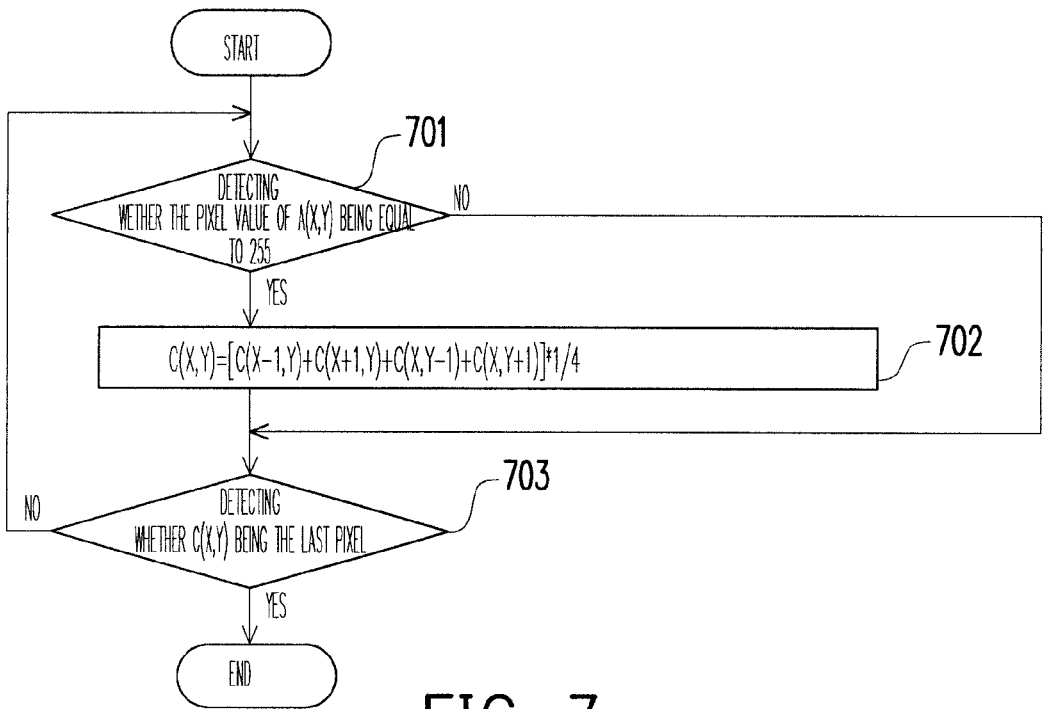
FIG. 7 is a flowchart illustrating the steps for compensating pixel values of defective pixels in an image according to another exemplary embodiment of the present invention.

Another embodiment of the present invention will be described for explaining the step of compensating for the pixel values of the defective pixels in the image (step S404). FIG. 7 is a flowchart illustrating a method for compensating pixel values of defective pixels according to an exemplary embodiment of the present invention. Referring to FIG. 7, in step 701, whether the pixel value of the pixel A(x, y) in the image is equal to 255 is detected. If the pixel value of the pixel A(x, y) is 255, the pixel C(x, y) is determined to be a defective pixel and step 702 is executed to use the average pixel value of the neighboring pixels around pixel C(x,y) (including C(x−1,y), C(x+1,y), C(x,y−1), and C(x,y+1)) as the pixel value of the pixel C(x,y) and step 703 is then executed; otherwise step 703 is directly executed to detect whether the pixel is the last pixel of the image. If so, the compensation procedure is completed, otherwise step 701 is executed to detect whether the pixel value of the next pixel is 255.

It should be noted that even though a possible pattern of the method for compensating pixel values of defective pixels has been described in foregoing embodiment, it should be understood by those having ordinary skill in the art that other possible patterns could also be adopted and the application of the present invention is not limited thereto. In other words, as long as the location information of defective pixels can be obtained for subsequent processing by marking the defective pixels as a specific pixel value, it is construed to be within the scope of the present invention.

In summary, in the present invention, the pixel values of defective pixels in an image are marked as a specific pixel value to compensate the pixel values of the defective pixels and to eliminate the noise caused by dark current. Moreover, since only the marks in the image are referred to when the pixel values of the defective pixels are calculated, it is not necessary to read the location information in the image repeatedly from the memory, accordingly, the access bandwidth of the memory is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for compensating pixel values of defective pixels, suitable for compensating the pixel values of a plurality of defective pixels in an image processing system, comprising:
   (a) capturing a first image to obtain pixel values of a plurality of pixels, marking the pixel values of the defective pixels as a specific pixel value, wherein if the pixel value of a particular pixel is equal to the specific pixel value, the pixel value of the particular pixel is changed to another close value, wherein the specific pixel value is a maximum value or a minimum value of all of the pixel values;
   (b) re-calculating the pixel values of all of the pixels to allow the pixel values of the pixels to be smaller than the specific pixel value but not smaller than the minimum value when the specific pixel value is the maximum value, or re-calculating the pixel values of all of the pixels to allow the pixel values of the pixels not to be smaller than the specific pixel value but smaller than the maximum value when the specific pixel value is the minimum value; and
   (c) locating a plurality of neighboring pixels around locations of the specific pixel value, calculating average pixel values of the neighboring pixels and using the average pixel values as the pixel values of the defective pixels.

2. The compensation method as claimed in claim 1, wherein step (a) further comprises:
   (a1) storing the first image into a storage unit.

3. The compensation method as claimed in claim 1, wherein step (b) comprises:
   (b1) capturing a second image to obtain pixel values of the pixels;
   (b2) reading the first image from the storage unit;
   (b3) respectively subtracting pixel values of the first image from pixel values of the second image to obtain a third image; and
   (b4) locating pixels having the specific pixel value in the first image, calculating average pixel values of the neighboring pixels of the corresponding pixels in the third image and using the average pixel values as the pixel values of the defective pixels in the third image.

4. The compensation method as claimed in claim 3, wherein one of the first and the second image is a dark image captured when the shutter of the image processing system is closed.

5. The compensation method as claimed in claim 3, wherein the first and the second image are captured under similar exposure conditions.

6. The compensation method as claimed in claim 1, wherein the specific pixel value is one of 0 and 255 or any other integer value between 0 and 255.

7. The compensation method as claimed in claim 6, wherein when the specific pixel value is 255, step (a) further comprises:
   changing the pixel values of the pixels originally having pixel value 255 to 254.

8. The compensation method as claimed in claim 6, wherein when the specific pixel value is 0, step (a) further comprises:
   changing the pixel values of the pixels originally having pixel value 0 to 1.

9. The compensation method as claimed in claim 6, wherein when the specific pixel value is any other value between 0 and 255, step (a) further comprises:
   changing the pixel values of the pixels originally having the specific pixel value to a value close to the specific pixel value.

10. The compensation method as claimed in claim 6, wherein when the specific pixel value is 255, step (a) comprises:
    re-calculating the pixel values of all of the pixels to allow the pixel values of the pixels to fall between 0 and 254 through mapping.

11. The compensation method as claimed in claim 6, wherein when the specific pixel value is 0, step (a) comprises:
    re-calculating the pixel values of all of the pixels to allow the pixel values of the pixels to fall between 1 and 255 through mapping.

12. The compensation method as claimed in claim 1, wherein the neighboring pixels comprise the pixels on left and right sides of the original pixel, pixels above and below the original pixel, or pixels around the original pixel.

13. An image processing system, comprising:
    an image sensor, comprising a plurality of pixels, suitable for capturing a first image;
    an image signal processor, coupled to the image sensor, suitable for receiving the first image, so as to obtain pixel values of a plurality of pixels, and marking the pixel values of the defective pixels as a specific pixel value, wherein the specific pixel value is a maximum value or a minimum value of all of the pixel values, and if the pixel value of a particular pixel is equal to the specific pixel value, the pixel value of the particular pixel is changed to another close value, the image signal processor re-calculating the pixel values of all of the pixels to allow the pixel values of the pixels to be smaller than the specific pixel value but not smaller than the minimum value when the specific pixel value is the maximum value, or the image signal processor re-calculating the pixel values of all of the pixels to allow the pixel values of the pixels not to be smaller than the specific pixel value but smaller than the maximum value when the specific pixel value is the minimum value; and
    a first storage unit, coupled to the image signal processor, suitable for storing the first image processed by the image signal processor, wherein before outputting the first image, the image signal processor reads the previously processed first image from the first storage unit, locates a plurality of neighboring pixels around the locations of the specific pixel value in the first image, calculates average pixel values of the neighboring pixels, and uses the average pixel values as pixel values of the defective pixels.

14. The image processing system as claimed in claim 13, wherein the image signal processor further comprises:
  receiving a second image from the image sensor to obtain the pixel values of a plurality of pixels;
  reading the first image from the first storage unit;
  respectively subtracting the pixels values of the first image from the pixel values of the second image to obtain a third image; and
  locating the pixels having the specific pixel value in the first image, calculating average values of the neighboring pixels around the corresponding pixels in the third image, and using the average pixel values as the pixel values of the defective pixels in the third image.

15. The image processing system as claimed in claim 13 further comprising:
  a display unit, coupled to the image signal processor, suitable for displaying an image output by the image signal processor.

16. The image processing system as claimed in claim 15, wherein the display unit comprises one of a liquid crystal display (LCD) and an organic light emitting diode (OLED) display.

17. The image processing system as claimed in claim 13 further comprising:
  a lens module, disposed at a front of the image sensor and coupled to the image signal processor, suitable for receiving a control signal output by the image signal processor for adjusting an exposure time when capturing the first image.

18. The image processing system as claimed in claim 13, wherein the first storage unit comprises one of a dynamic random access memory (DRAM) and an electrically erasable programmable read-only memory (EEPROM).

19. The image processing system as claimed in claim 13 further comprising:
  a second storage unit, coupled to the image signal processor, suitable for storing an image output by the image signal processor.

20. The image processing system as claimed in claim 19, wherein the second storage unit comprises one of a hard disk (HD) and a flash memory.

\* \* \* \* \*